United States Patent [19]
Sado et al.

[11] 4,321,688
[45] Mar. 23, 1982

[54] ELECTRONIC EQUIPMENT CAPABLE OF STATISTIC PROCESSING

[75] Inventors: Ichiro Sado; Shigeru Matsuyama, both of Tokyo, Japan

[73] Assignee: Canon Kabushiki Kaisha, Tokyo, Japan

[21] Appl. No.: 86,438

[22] Filed: Oct. 19, 1979

Related U.S. Application Data

[63] Continuation of Ser. No. 833,343, Sep. 14, 1977, abandoned.

[30] Foreign Application Priority Data

Sep. 27, 1976 [JP] Japan .................. 51-115570

[51] Int. Cl.³ .................. G06F 15/36; G06F 3/023; G06F 3/14; G06F 13/00
[52] U.S. Cl. .................. 364/900; 364/554
[58] Field of Search ... 364/200 MS File, 900 MS File, 364/709, 710, 715, 554; 235/92 DP

[56] References Cited
U.S. PATENT DOCUMENTS

| | | |
|---|---|---|
| 3,553,445 | 1/1971 | Hernandez .................. 364/900 |
| 3,593,313 | 7/1971 | Tomaszewski et al. .................. 364/200 |
| 3,610,902 | 10/1971 | Rahenkamp et al. .................. 364/710 |
| 3,820,080 | 6/1974 | Abrams et al. .................. 364/900 |
| 3,859,635 | 1/1975 | Watson et al. .................. 364/200 |
| 3,976,975 | 8/1976 | Cochran .................. 364/709 X |
| 4,001,569 | 1/1977 | Dickinson et al. .................. 364/715 |
| 4,071,891 | 1/1978 | Barrows .................. 364/715 |
| 4,107,782 | 8/1978 | Cochran .................. 364/706 |

*Primary Examiner*—James D. Thomas
*Attorney, Agent, or Firm*—Fitzpatrick, Cella, Harper & Scinto

[57] ABSTRACT

In an electronic equipment capable of statistic processing of the type wherein numeric data of a plurality of variables are entered in a predetermined sequence and then statistically processed (for instance, a numeric data $X_1$ is entered first and then a numeric data $Y_1$ is entered and thereafter the data $X_1$ and $Y_1$ are statistically processed. Thereafter, in like manner a numeric data $X_2$ is entered and then $Y_2$ is entered, and so on.), an arrangement whereby one may easily check a numeric data to be entered next; that is, whether a numeric data to be entered next is a data $X_n$ or $Y_n$.

5 Claims, 2 Drawing Figures

ELECTRONIC EQUIPMENT CAPABLE OF STATISTIC PROCESSING

This is a continuation, of application Ser. No. 833,343, filed Sept. 14, 1977, now abandoned.

BACKGROUND OF THE INVENTION

The present invention relates to an electronic equipment capable of statistic processing.

With two variables X and Y, the commonest input sequence for statistic processing is to alternately enter the data Xn and Yn where n is an integer from 1 to N. That is, in addition to the numeral keys for entering the numeric data, a statistic data input instruction key SUM is provided, and the statistic data Xn and Yn and the statistic data input instruction SUM are entered in the following simple yet cumbersome sequence:

$X_1$, SUM, $Y_1$, SUM, $X_2$, SUM, $Y_2$, SUM, ..., Xn, SUM, Yn, ... $X_{N-1}$, SUM, $Y_{N-1}$, SUM, $X_N$, SUM, $Y_N$, SUM.

However with a conventional electronic equipment capable of statistic processing of the type described, the display is not changed even after the key SUM has been depressed so that one may very often forget to depress the key SUM or one may depress the key SUM twice in succession. In addition, when the data Xn and Yn have the same value or when the data Yn and $X_{n+1}$ have the same value, one may not very often check whether he has just entered the numeric data Xn or Yn or Yn or $X_{n+1}$, thus resulting in an erratic operation.

SUMMARY OF THE INVENTION

Accordingly, one of the objects of the present invention is to provide an electronic equipment capable of statistic processing which is provided with an alarm device for avoiding such erratic operations as described above.

Another object of the present invention is to provide an electronic equipment capable of statistic processing which is provided with an indicator or an indicating lamp which is alternately turned on and off in response to the depression of the key SUM so that one may easily check whether a numeric data to be entered next is an Xn or Yn from the on-off state of the indicating lamp and the display of the numeric data previously entered, whereby an erratic entry of a numeric data may be diverted.

A further object of the present invention is to provide an electronic equipment capable of statistic processing of the type described above wherein the indicating lamp which is alternately turned on and off every time when the key SUM is depressed is a display unit in a display device so that one may easily check which of n variables must be entered next or have been entered.

To the above and other ends, the present invention provides an electronic equipment capable of performing arithmetic operations comprising a plurality of numeral keys for entering a numeric data into the electronic equipment, a first register responsive to the depression of the numeral keys for storing therein the numeric data entered, a discrimination key for discriminating the numeric data in respect to a plurality of variables, a memory responsive to the depression of the discrimination key for memorizing the depression of the discrimination key, means responsive to the contents in the memory for displaying the item of the numeric data entered or the numeric data to be entered next, means responsive to the contents in said memory for discriminating the numeric data and storing them into a respective register, and means for visually displaying the numeric data.

DESCRIPTION OF THE PREFERRED EMBODIMENT

Figure 1:
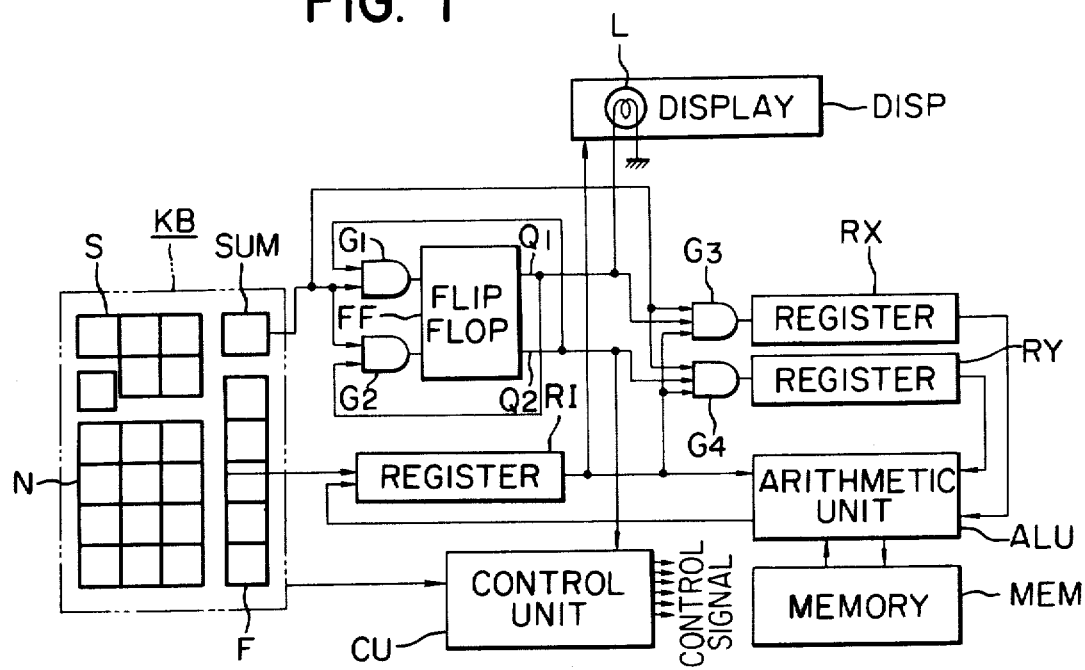
FIG. 1 is a block diagram of an electronic equipment in accordance with the present invention.
Figure 2:
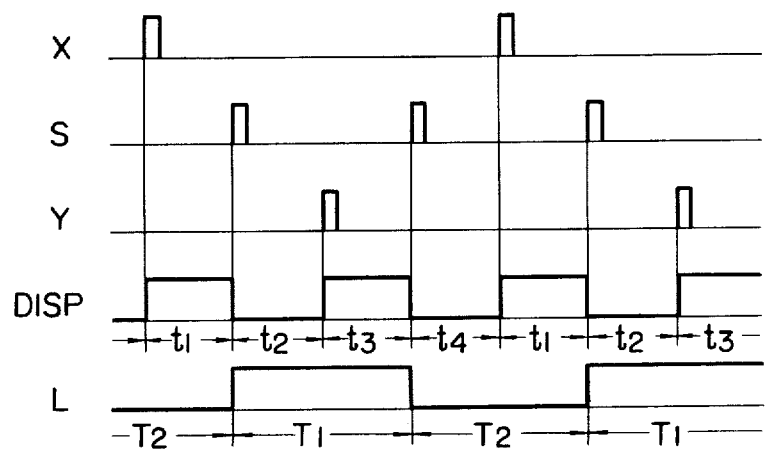
FIG. 2 is a timing chart used for the explanation of the mode of operation thereof.

Referring to FIGS. 1 and 2 the present invention will be described as being incorporated into an electronic computer. FIG. 1 is a block diagram of this electronic computer including as an input device a key board KB with numeral keys N, function keys F, statistic processing instruction keys S, a statistic data input key SUM and so on. The electronic computer further includes a flip-flop FF which is driven into the set state or the reset state in response to the signal from the statistic data input key SUM, data storage registers RI, RX and RY, an arithmetic logic circuit ALU consisting of adders, shift registers, registers, and various logic gates, and a memory MEM consisting of a plurality of registers interconnected with the arithmetic logic unit ALU for data transfer and storage. The electronic computer further includes a display device DISP for decoding and displaying the contents in the register RI, an indicator or a lamp L when the flip-flop FF is in the set state with $Q_1$ output logical-1 and $Q_2$ output logical-0, AND gates G1–G4, and a control unit CU having a sequence control circuit, a read-only memory (ROM) and so on. In response to the signals from the arithmetic logic unit ALU, the keyboard KB, the display device DISP, the memory MEM and so on, the control unit CU reads out a microprogram such as a statistic processing program, display program and so on stored in the ROM and generates control signals for controlling arithmetic logic unit ALU, display device DISP, memory MEM and so on. A microprogram control, for example, as shown in U.S. Pat. No. 3,859,635 may be used for such control unit CU. The sequence control circuit consists of a clock pulse generator, a time-delay circuit, various gates and logic circuits and so on.

Next the mode of operation of the electronic computer with the above construction will be described with further reference to FIG. 1. First, one depresses the numeral keys N to enter a statistic data $X_1$ into the register RI. Then, the contents or the data $X_1$ in the register RI is immediately displayed on the display device DISP for a time interval $t_1$ (See FIG. 2).

Next one depresses the key SUM, in response to the signal from the key SUM, the flip-flop FF is driven into the reset state with $Q_1$=logical-1 and $Q_2$=logical-0, and in response to the $Q_1$=logical-1 signal the indicator L is turned on, thus indicating that the key SUM has been depressed. Concurrently, in response to the signal from the key SUM and the signal $Q_1$=logical-1 from the flip-flop, AND gate G3 is opened so that the contents in the register RI is transferred into the register RX. As a result, the contents of the register RI becomes zero, and the display device DISP is deactivated; that is, it displays nothing for a time interval $t_2$ (See FIG. 2).

Thereafter one depresses the numeral keys N to enter a statistic data $Y_1$ into the register RI. The data $Y_1$ stored in the register RI is displayed on the display device DISP for a time interval $t_3$ (See FIG. 2). During this period the flip-flop FF remains in the set state with $Q_1$=logical-1 and $Q_2$=logical-0, and the indicator L is kept on for a time interval $T_1$ (See FIG. 2).

When one depresses the key SUM, the flip-flop FF is driven into the reset state with $Q_1$=logical-0 and $Q_2$=logical-1 so that the indicator L is turned off and kept off until the key SUM is depressed again for a time interval $T_2$ (See FIG. 2). Concurrently in response to the signal from the key SUM and the $Q_2$=logical-1 signal from the flip-flop FF, AND gate $G_4$ is opened so that the contents in the register RI is transferred into the register RY. As a result, the contents in the input register RI becomes zero again, and the display device DISP displays nothing for a time interval $t_4$ (See FIG. 2).

In response to $Q_2$=logical-1 signal from the flip-flop FF, the control unit CU transmits control signals to the arithmetic logic unit ALU, the memory MEM and the registers RX and RY so that the contents or the data $X_1$ and $Y_1$ in the registers RX and RY are transferred into the arithmetic and logic unit ALU and are statistically processed.

In like manner, the next statistic data $X_2$ and $Y_2$ are entered and processed.

So far the indicator or the indicating lamp L of present invention has been described as being turned on when the data $X_1$ has been entered and then turned off when the data $Y_1$ has been entered, but it will be understood that the indicating lamp L may be turned off when the data $X_1$ has been entered and turned on when the data $Y_1$ has been entered in response to the depression of the key SUM.

As described above, according to the preferred embodiment of the present invention, in response to the depression of the key SUM after the data Xn has been entered, the display of the data Xn entered is interrupted and the indicating lamp L is turned on, and in response to the depression of the key SUM after the data Yn has been entered, the display of the data Yn entered is interrupted and the indicating lamp L is turned off. As a result, from the combinations of the display being on or off and the indicating lamp being on or off as shown in TABLE below, one may easily check whether the key SUM has been already depressed or not and whether a data to be entered or a data which has been already entered is an Xn data or Yn data.

|      |     | Next data to be entered is Xn | Data Xn has been entered and key SUM must be depressed | Next data to be entered is Yn | Data Yn has been entered, and the key SUM must be depressed |
|------|-----|---|---|---|---|
| DISP | ON  |   | ○ |   | ○ |
|      | OFF | ○ |   | ○ |   |
| L    | ON  |   | ○ | ○ | ○ |
|      | OFF | ○ | ○ |   |   |

The present invention is not limited to the above exemplary embodiment, and various modifications may be effected without departing the true spirit of the present invention. For instance, instead of the indicating lamp L a display unit for displaying a numeral in the display device may be used. Alternatively, a suitable display unit may be added to the display device. In case of a seven-bar-segment display unit, a suitable combination of segments may be turned on and off to indicate that the key SUM has been depressed. Instead of interrupting the display of the entered data Xn or Yn upon depression of the key SUM, the display of the data Xn or Yn previously entered may be interrupted in response to the entering of the most significant digit of the data to be entered next. So far the present invention has been described in conjunction with the two variables Xn and Yn, but it will be apparent to those skilled in the art based on the detailed description above that with three variables an arrangement may be made so that one may be easily check if the next data to be entered is Xn, Yn or Zn.

What we claim is:

1. Electronic calculating equipment capable of dealing with a statistic numerical information including at least two variables comprising:

numeral input means for entering a numerical information;

instruction input means for entering an information to indicate that the numerical information from said numeral input means is treated as a statistic information;

storage means for storing the statistic numerical information including a plurality of variables, said storage means comprising a plurality of storage units (N) corresponding to the variables in the number, and in each of which storge units the different variable is stored;

status storage means for storing a discrimination information to discriminate said plurality of storage units (N) so that each of the storage units can store the associated variable;

first control means coupled to said instructing input means and said status storage means for controlling said status storage means to store the discrimination information so that the different one of said storage units (N) is sequentially addressed in response to every operation of said instructing input means;

second control means coupled to said storage means and said instructing input means for controlling said storage means to store the variables such that the respective variable is stored in the associated storage unit of said storage means in accordance with the discrimination information of said status storage means; and visualizing means coupled to said status storage means for visualizing the discrimination information of said status storage means.

2. Electronic calculating equipment according to claim 1 further comprising statistic processing means responsive to the discrimination information of said status storage means for performing the statistic processing between the variables stored in said storage means.

3. Electronic calculating equipment according to claim 1 or 2 wherein said status storage means comprises one bit memory alternatively changing its output status in response to the operation of said indicating means.

4. Electronic calculating equipment capable of dealing with a numerical information including at least two variables (Sn, Yn) comprising:

numeral input means for entering a numerical information;

key means for indicating that the numerical information entered from said input means is treated as the variable information;

storage means for storing a plurality of variables, said storage means comprising a plurality of storage units (N) corresponding to the variables in the number, and in each of which storage units the different variable is stored;

counter means connected to key means for counting the operation times of said key means to cause each of said storage units (N) to store the associated variable, said counter means being a recursive counter recursively operable after counting N times operation of said key means;

means connected to said numeral input means and responsive to the operation of said key means for controlling said storage means to store the variables such that the respective variable is stored in the associated storage unit of said storage means in accordance with the counting value of said counter means; and visualizing means connected to said counter means for visualizing the value of count of said counting means.

5. An electronic calculating equipment according to claim 4 wherein said counter means comprises a Flip-Flop.

* * * * *

UNITED STATES PATENT AND TRADEMARK OFFICE
CERTIFICATE OF CORRECTION

PATENT NO. : 4,321,688

DATED : March 23, 1982

INVENTOR(S) : ICHIRO SADO, et al

It is certified that error appears in the above-identified patent and that said Letters Patent is hereby corrected as shown below:

Column 3, between lines 47 and 56,

"
|       |     | Next data to be entered is Xn | Data Xn has been entered and key SUM must be depressed | Next data to be entered is Yn | Data Yn has been entered, and the key SUM must be depressed |
|-------|-----|---|---|---|---|
| DISP  | ON  |   | O |   | O |
|       | OFF | O |   | O |   |
| L     | ON  |   | O | O |   |
|       | OFF | O | O |   | O |
"

should read as follows:

--
|       |     | Next data to be entered is Xn | Data Xn has been entered and key SUM must be depressed | Next data to be entered is Yn | Data Yn has been entered, and the key SUM must be depressed |
|-------|-----|---|---|---|---|
| DISP  | ON  |   | O |   | O |
|       | OFF | O |   | O |   |
| L     | ON  |   | O | O |   |
|       | OFF | O | O |   | O |
--

Signed and Sealed this

First Day of June 1982

[SEAL]

Attest:

Attesting Officer

GERALD J. MOSSINGHOFF

Commissioner of Patents and Trademarks